United States Patent
Anuj et al.

(10) Patent No.: US 9,639,584 B2
(45) Date of Patent: May 2, 2017

(54) SYSTEM AND METHOD FOR DATA PROCESSING, STORAGE AND RETRIEVAL USING DATA FOLDING TECHNIQUE

(71) Applicant: Formcept Technologies and Solutions Private Limited, Bangalore (IN)

(72) Inventors: Kumar Anuj, Karnataka (IN); Srinivasan Suresh, Karnataka (IN)

(73) Assignee: FORMCEPT TECHNOLOGIES AND SOLUTIONS PRIVATE LIMITED, Bangalore (IN)

( * ) Notice: Subject to any disclaimer, the term of this patent is extended or adjusted under 35 U.S.C. 154(b) by 340 days.

(21) Appl. No.: 14/589,555

(22) Filed: Jan. 5, 2015

(65) Prior Publication Data

US 2015/0193513 A1  Jul. 9, 2015

(30) Foreign Application Priority Data

Jan. 7, 2014 (IN) .............................. 68/CHE/2014

(51) Int. Cl.
  *G06F 17/30* (2006.01)
  *G06F 7/00* (2006.01)

(52) U.S. Cl.
  CPC .. *G06F 17/30563* (2013.01); *G06F 17/30424* (2013.01)

(58) Field of Classification Search
  USPC ........................................................ 707/602
  See application file for complete search history.

(56) References Cited

U.S. PATENT DOCUMENTS

| 2012/0191716 | A1* | 7/2012 | Omoigui | H01L 27/1463 707/740 |
| 2013/0124545 | A1* | 5/2013 | Holmberg | G06F 17/30244 707/756 |
| 2013/0332478 | A1* | 12/2013 | Bornea | G06F 17/30946 707/763 |
| 2015/0339788 | A1* | 11/2015 | Dawson | G06F 21/6227 705/311 |

* cited by examiner

*Primary Examiner* — Kuen Lu
(74) *Attorney, Agent, or Firm* — Luoh J. Wu; Continent Patent Office LLP

(57) ABSTRACT

The present invention relates to a system and method for pre-processing the data and storing the pre-processed data based on its type at the time of storage. During the pre-processing time, the system extracts all the relevant information such as entities, events/time stamped data, domain specific associations from the received content and stores them separately in a different data store. The system also generates different views based on the correlation between the identified entities, events and domain specific associations using data folding techniques. The system also stores the created views in a separate data store such as a view store, wherein the view store is optimized to serve end user queries by traversing through the stored views.

19 Claims, 15 Drawing Sheets

| Caller id (501) | Caller no (503) | Callee id (502) | Callee no (504) | Start Timestamp (505) | End Timestamp (506) |
|---|---|---|---|---|---|
| Cr001 | +140xxxxx001 | Ce005 | +140xxxxx005 | Thu Mar 01 11:38:11 PST 2012 | Thu Mar 01 12:51:16 PST 2012 |
| Cr001 | +140xxxxx001 | Ce002 | +140xxxxx002 | Fri Mar 02 07:10:14 PST 2012 | Fri Mar 02 07:12:10 PST 2012 |
| Cr001 | +140xxxxx001 | Ce003 | +140xxxxx003 | Tue Mar 06 20:12:07 PST 2012 | Tue Mar 06 20:20:02 PST 2012 |
| Cr003 | +140xxxxx003 | Ce004 | +140xxxxx004 | Sat Mar 10 14:01:45 PST 2012 | Sat Mar 10 14:05:23 PST 2012 |
| Cr002 | +140xxxxx002 | Ce004 | +140xxxxx004 | Mon Mar 12 17:10:05 PST 2012 | Mon Mar 12 17:11:34 PST 2012 |
| Cr003 | +140xxxxx003 | Ce005 | +140xxxxx005 | Sat Mar 24 12:20:35 PST 2012 | Sat Mar 24 12:30:12 PST 2012 |

FIG 5a

SYSTEM AND METHOD FOR DATA PROCESSING, STORAGE AND RETRIEVAL USING DATA FOLDING TECHNIQUE

PREAMBLE TO THE DESCRIPTION

The following specification particularly describes the invention and the manner in which it is to be performed:

TECHNICAL FIELD OF THE INVENTION

This invention relates to a system and method for data processing, storage and retrieval using data folding technique.

BACKGROUND OF THE INVENTION

Increasing business and individual electronic needs is directly proportional to increasing large electronic data volume, as all the paper work is being transferred to electronic document. Also nowadays a large volume of electronic data increases, as most of the companies in US have at least 100 terabytes of stored data and as much as 2.5 quintillion bytes of data are created each day. Also with the frequent flow of data from sources such as sensors, machines, social media sites, the velocity of electronic data is massive and continuous. Effective analysis of large volume of organizational and individual data from multiple varieties of internal and external sources such as transactions, social media content, enterprise content, sensors and mobile devices is required for deriving various useful insights for business as well as individual needs.

One of the biggest problem while handling large volume/big data is the veracity of data. Is the data being stored is mined meaningful and stored in such a way that the retrieval of data is done efficiently.

When faced with a large volume of varied velocity of data, from a variety of internal and external sources, it is a natural human tendency to divide and conquer. But, the existing databases do not pre-process and stores the pre-processed large volume of varied variety of data based on its content type such that the analysis and retrieval of data is done efficiently in a seamless manner. Also the existing databases does not allow grouping of data based on user defined domains.

Though some existing databases provide grouping of data based on user defined domains when faced with a large volume of varied velocity of data from a variety of internal and external source, they does not support effective retrieval of data for complex queries.

Hence there exists a need of a data storage system that pre-processes and stores the data based on its content type such that the analysis and retrieval of data is done efficiently in a seamless manner.

SUMMARY OF THE INVENTION

The following provides a simplified summary of the innovation bringing out a basic understanding of some aspects which are described in detail in later sections. This summary is not extensive and is not intended to identify all critical aspects or define the scope of the present innovation. It is presented with the sole purpose of giving a simple overview of some elements of the subject matter as a prelude to a more detailed presentation later.

The present invention overcomes drawbacks of the prior art by providing a system and method for pre-processing the data and storing the pre-processed data based on its type (such as entity dataset, event dataset, domain specific association dataset) at the time of storage. During the pre-processing time, the system extracts all the relevant information such as entities, events/time stamped data, domain specific associations from the received content and stores them separately in a different data store. For instance, entities are extracted from the received content and the extracted entities are stored in an entity store, events are extracted from the received content and the extracted events are stored in an event store, wherein the event data store is designed to serve end user queries based on time ranges.

In accordance with one or more embodiment of the present invention, the system creates data lattice using the identified events/time stamped data, domain specific associations and stores the created data lattices as views. The views so created are stored back into the view store, wherein the view store is optimized for querying these views. The system of the present invention creates data lattices using at least any one of the applicable correlation technique such as a formal concept analysis, a causal analysis, association rules, a time-series overlap analysis or any other correlation method. The correlation technique is chosen based on the domain, dataset, possible relationships between the identified entities, events and their explicit associations identified during the pre-processing stage. Here, the domain specific associations are either user defined associations or domain specific associations. The relationship so identified between the entities, events and their domain specific associations is a direct relationship (based on keywords) or an inferred relationship (based on semantic relations, timestamp based linkages etc). The system stores the created data lattices as a view so that the system queries the stored views based on the requirement of the end user. The data lattices so created and stored is further folded to create higher level of data lattices.

BRIEF DESCRIPTION OF THE DRAWINGS

FIG. 5a illustrates an exemplary caller-callee content required for generating caller-callee view in accordance with one or more embodiment of the present invention.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The term 'end user' used herein refers to any analyst such as a business analyst or a research analyst or any information seekers seeking intelligence from a large volume of varied variety of data.

The term 'content' used herein refers to any structured or unstructured data.

Figure 1:
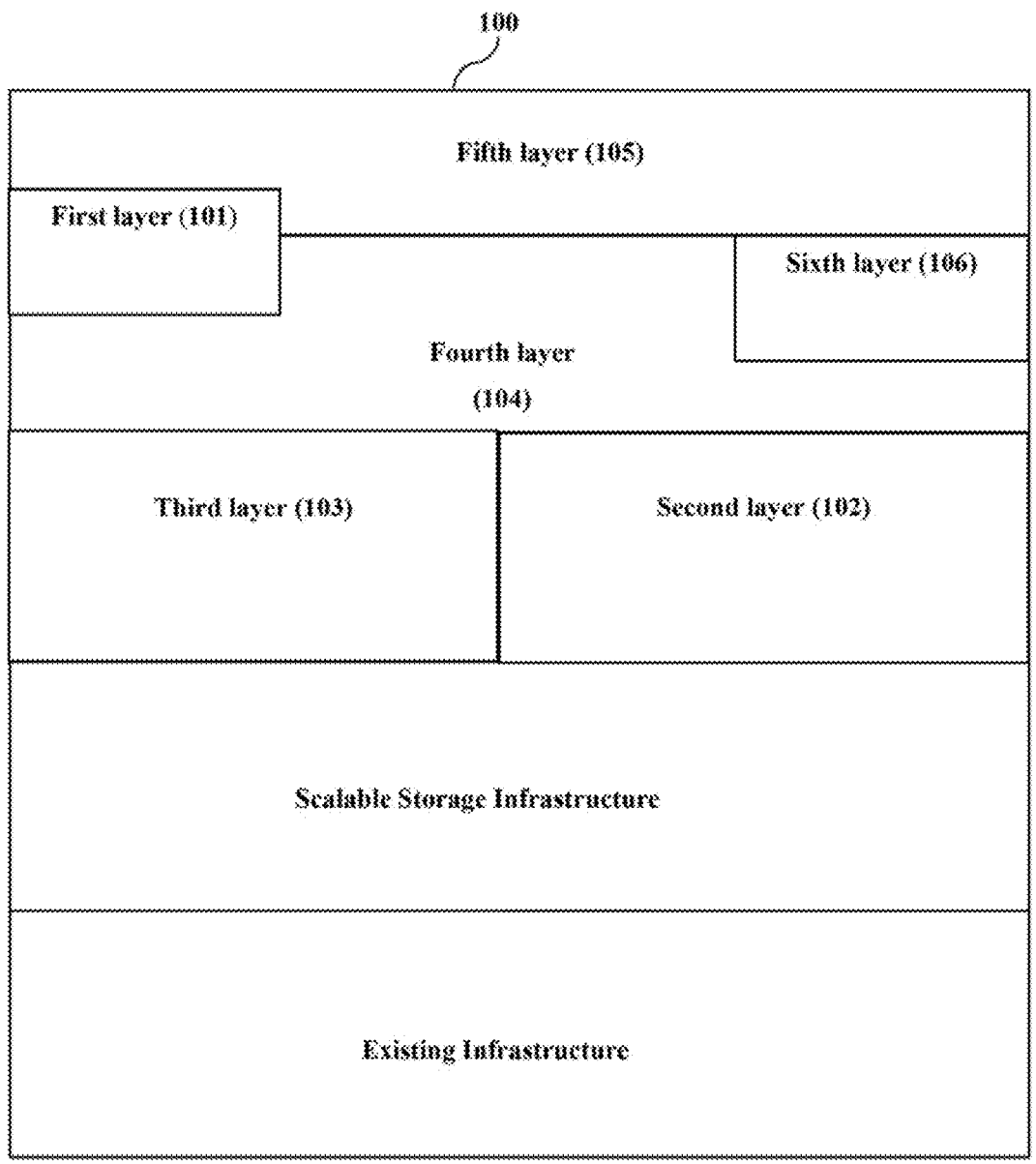
FIG. 1 illustrates a system for data processing, storage and retrieval using data folding technique in accordance with one or more embodiment of the present invention.

FIG. 1 illustrates a system for data processing, storage and retrieval using data folding technique in accordance with one or more embodiment of the present invention. The system (100) of the present invention comprises a first layer (101) responsible for fetching structured and unstructured content from a variety of external data sources such as social media platforms or log servers or from various document stores. Here the document store is an external document storage system such as Dropbox, Google Docs, etc. The system also comprises a second layer (102) responsible for classifying, comparing and correlating the content fetched from various external data sources in the first layer (101). The second layer (102) uses a knowledge base for classifying the contents based on its type (using a knowledge base) and stores the received content based on its type after classification in the storage engine (103). The system (100) comprises a third layer (103) (i.e.) a storage engine, wherein the storage engine is configured to store the received classified content based on its type. The storage engine (103) is organized in such a way that the storage, retrieval, processing and analysis of content is done efficiently. The storage engine (103) is a layer implemented on the top of existing storage systems such as Hadoop, HBase etc. Thus the storage engine (103) of the present invention sits on the top of existing storage systems and has the logic of how to store the content and how to query the same.

The system (100) of the present invention also comprises a fourth layer (104), wherein the fourth layer (104) is responsible for coordinating all the activities within the system. The system (100) of the present invention also comprises a fifth layer with a big data analysis platform (105) for allowing the end users to build applications for performing analytics on the views created using data folding techniques stored in the storage engine (103). The system (100) also comprises a sixth layer (106) that acts as a delivery channel for delivering the analytics results/reports to the end user devices.

In accordance with one or more embodiment of the present invention, the system is capable of handling any variety of content, wherein the content is a structured data or an unstructured data. Unstructured data comprises plain text document, e-mail message, web page, word processing document, spreadsheet, presentation material, scanned document, PDF files, news/media reports, case files, transcriptions or enterprise content.

In accordance with one or more embodiment of the present invention, the content is a structured data. The structured data comprises a transactional data, data stored in relational database or any dataset that have a predefined structure.

Figure 1A:
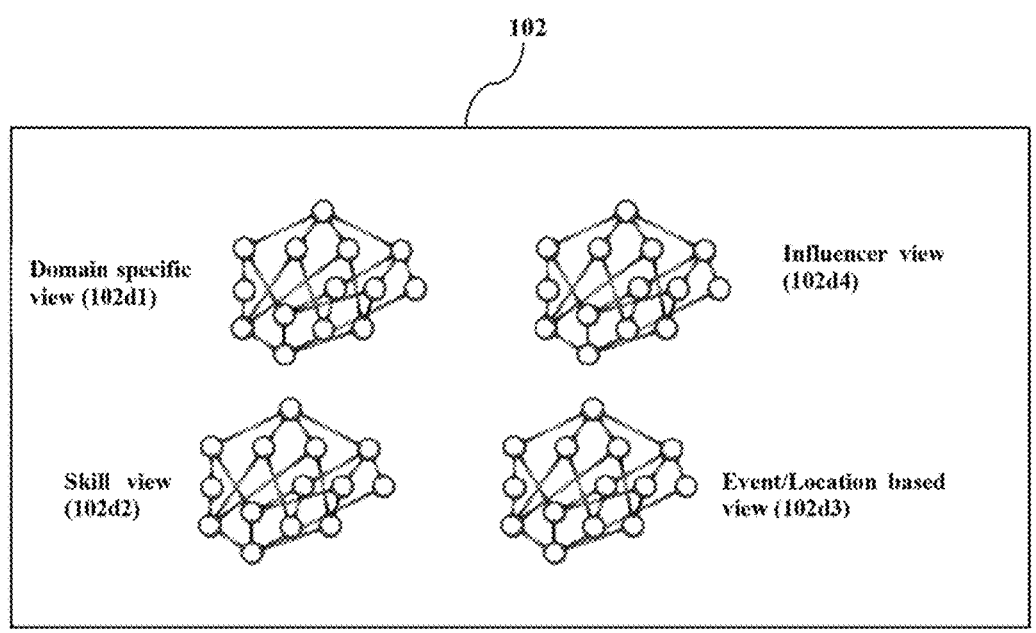
FIG. 1a illustrates the various views created by the second layer in accordance with one or more embodiment of the present invention

FIG. 1a illustrates the various views created by the second layer in accordance with one or more embodiment of the present invention. The second layer (102) creates various views such as domain specific association view (102d1), skill view (102d2), event based view (102d3), influencer view (102d4) using data folding techniques and stores the created views in the view store (103d, FIG. 1b).

Figure 1B:
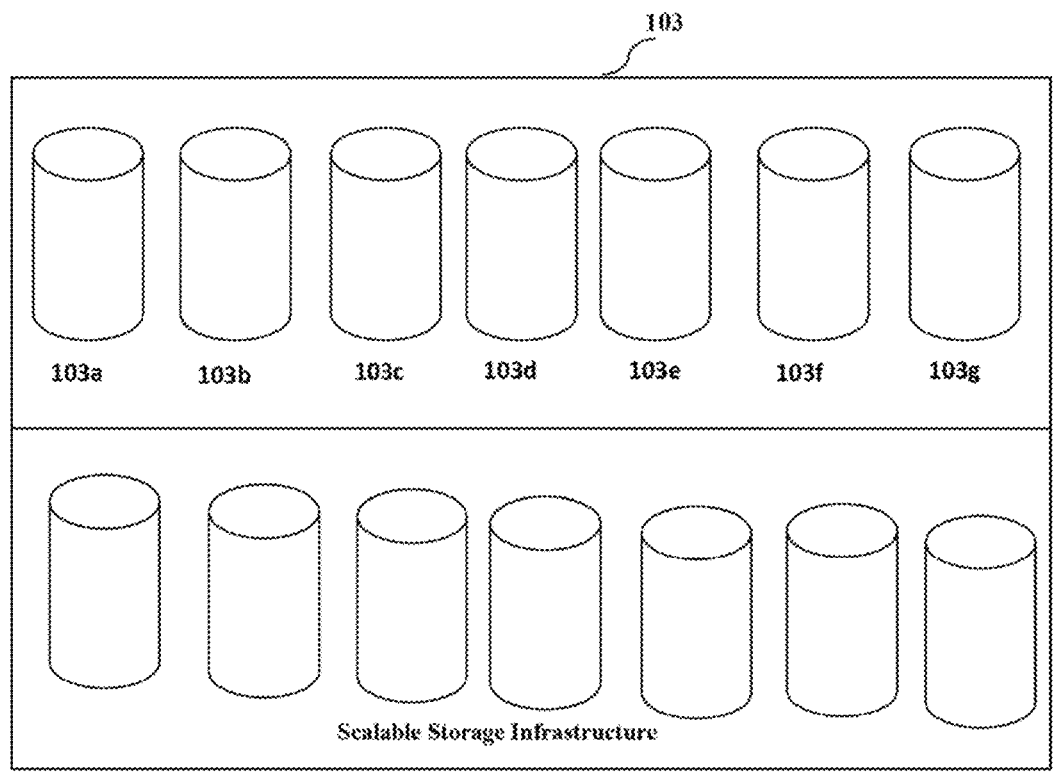
FIG. 1b illustrates the functionality of the third layer (storage engine) in detail in accordance with one or more embodiment of the present invention.

FIG. 1b illustrates the functionality of the third layer (storage engine) in detail in accordance with one or more embodiment of the present invention. The second layer (102) extracts all the relevant information such as entities, events/time stamped data from the received content and stores the extracted relevant information separately in a different data store in the storage engine (103). For this purpose, the storage engine (103) of the present invention comprises an entity store (103c) for storing the extracted entities along with their start and end location within the received content, an event store (103e) for storing the extracted events/time stamped data along with their start and end location within the received content, a graph store (103f) for storing the extracted domain specific associations along with their associated events and entities as graphs. The storage engine (103) of the present invention comprises a view store (103d) for storing the views generated using data folding technique. Here the view store (103d) is optimized to serve the end user queries by traversing through the stored views.

The system (100) also comprises a separate store such as a binary large object (BLOB) store (103b) for storing the content required for data processing, wherein the content is a structured data or an unstructured data or any other content generated using free form.

The system also comprises a log store (103g) for storing log details of servers, applications and networks. The system (100) of the present invention may also be used to generate various log activity views based on the extracted log details stored in the log store (103g). The system further comprises a batch store (103a) for storing the streamed dataset such as a stream of log data received from the log server.

In accordance with one embodiment of the present invention, the system also receives the content ID of the content that was uploaded earlier for extracting all the relevant information such as entities, events/time stamped data of the content stored in the BLOB store (103b). If the system (100) receives the content ID, the system (100) also fetches the content from the BLOB store (103b).

The second layer (102) of the present invention removes any unrecognizable special characters, extra whitespaces from the start and end of content before processing the content for extraction of the relevant information such as entities, events/time stamped data.

The second layer (102) of the present invention uses a knowledge base to identify entities present in the received content, wherein the knowledge base comprises ontology to determine the type of entity (such as person, place) based on the context of the received content. For instance, if the received content is a resume document, the second layer (102) of the present invention extracts entities such as skills, places, degrees, colleges and organization from the received content. The second layer (102) then stores the extracted entities along with their start and end location within the resume plain text in an entity store (103c). The entities may also be a part of categorization hierarchy defined by the ontology of knowledge base. For example, if Java is identified as a skill from the received content, then the entire hierarchy for "Java", i.e. "Computer Science→Programming Languages→Object Oriented Programming Languages→Java" is also stored within the entity in the entity store (103c).

The second layer (102) then extracts the events/timestamps within the content. The second layer (102) then stores the extracted events/timestamps in the event store (103e) along with the entities present in the event. In case the received content is a resume document then the event scope is the text around the event that is related to it. For example, if the received content from the resume is as follows:

"PhD at MIT Media Lab, Massachusetts Institute of Technology 2008 to current: Massachusetts Institute of Technology; CPA 5.0/5.0"

Here the second layer (102) extracts the event "2008 to current" and store it within the event store (103e) along with the entities present in the event (i.e. PhD (degree), "MIT" (Organization)), the exact start and end location of the event within the resume plain text content. The start location, end location and entities stored are later used to generate views.

The second layer (102) also extracts some domain specific associations that are defined either by the end user (user defined associations) or derived based on domain. These extracted domain specific associations along with the associated events and entities are stored as graphs within the graph store (103f). Later, these domain specific association graphs are used by the system to identify additional views based on the domain/user-defined associations. Once all the entities, events and domain specific associations are extracted, the system creates data lattices for the extracted entities, events and associations and stores the created data lattices as a view in a view store (103d). Here the data lattices are created using at least any one of the applicable correlation technique such as a formal concept analysis, a causal analysis, association rules, a time-series overlap analysis or any other correlation method.

The term "data folding technique" used herein represents the process of creation of data lattices using the extracted entities, events and domain specific associations and storing the created data lattices as a view.

The second layer (102) of the present invention generates view periodically and dynamically based on user-defined associations. The second layer (102) also stores the extracted entities, events, associations along with the content ID to drill down to the source content from where the entities, events and associations were extracted. The second layer (102) also determines the relation between the contents.

The second layer (102) of the present invention creates data lattices using at least any one of the applicable correlation technique such as a formal concept analysis, a causal analysis, association rules, a time-series overlap analysis or any other correlation method. The correlation technique is chosen based on the possible relationships between the identified entities, events and their explicit associations identified during the pre-processing stage. Here, the domain specific associations are either user defined associations or domain specific associations.

Though the foregoing embodiments illustrate the generation of various view using data folding technique with the help of resume documents for unstructured data, and caller-callee content for structured data. The system of the present invention may be used for creation and storage of views for any structured and unstructured data using data folding technique.

Let us consider the system (100) of the present invention is used for resume analysis using data folding technique in accordance with one or more exemplary embodiment of the present invention. In this case, the second layer (102) generates at least two basic views namely skill view (as shown in FIG. 2) and event view (as shown in FIG. 3).

Figure 2:
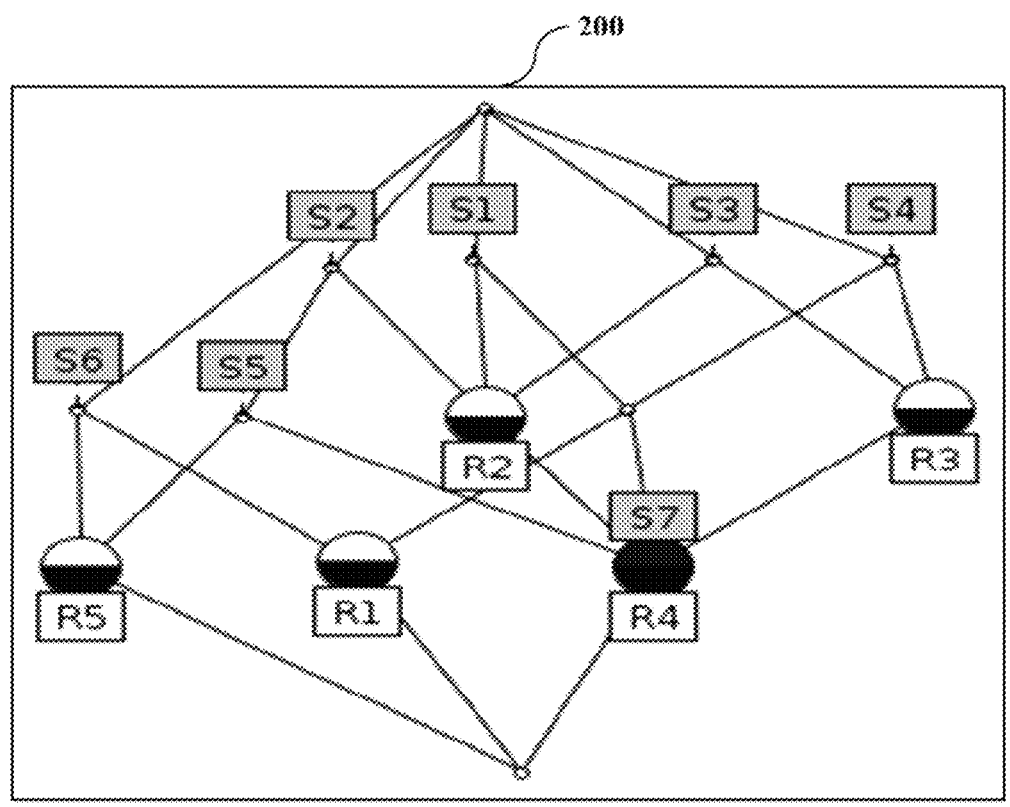
FIG. 2 illustrates an entity view generated by the system in accordance with one or more embodiment of the present invention.
Figure 3:
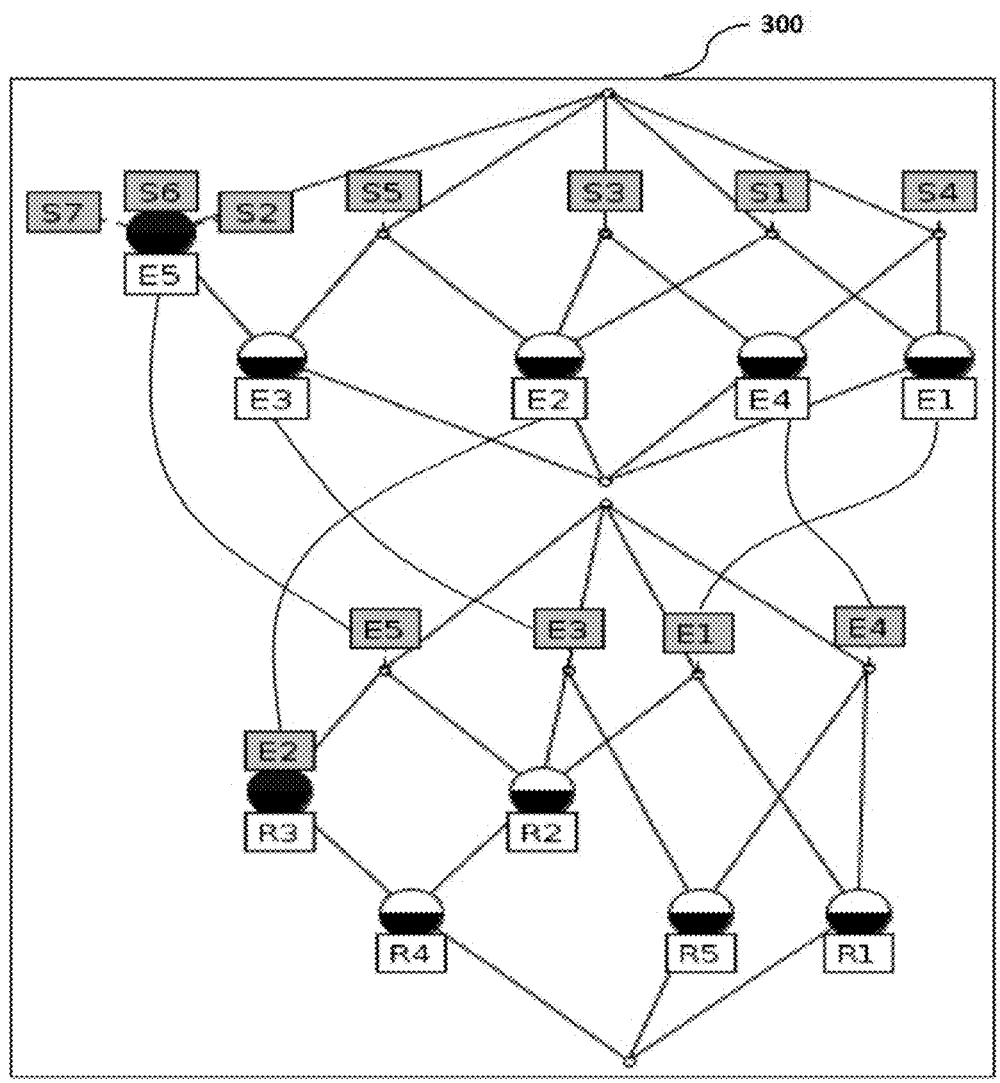
FIG. 3 illustrates an event view generated by the system in accordance with one or more embodiment of the present invention.

FIG. 2 illustrates an entity view generated by the system in accordance with one or more embodiment of the present invention. The second layer (102) of the present invention constructs entity view in this case skill view (200) using data folding techniques, based on the entities extracted from the individual content in this case individual resume. The second layer (102) links the resumes that have the same skill. The second layer (102) of the present invention creates data lattices of the set of resume having a particular skill and stores the created data lattices as a view, so that the stored view is retrieved later when the query is raised by the end user.

For instance, if the second layer (102) receives content, in this case the received contents are resume documents such as R1, R2, R3, R4 and R5, the second layer (102) extracts the skill (entities) from the received content (each resume document) as follows:

R1-S1, S4, S6
R2-S1, S2, S3
R3-R3, S4
R4-S1, S2, S3, S4, S5, S7
R5-S2, S5, S6

The second layer (102) then applies a formal concept analysis, a causal analysis, association rules, a time-series overlap analysis or any other correlation method to the extracted skill set to create a skill set view (as shown in FIG. 2). The system uses this skill set view to answer a number of queries related to skills such as all the resumes having a particular skill such as skill S1 or a combination of skills S1, S2 and S3.

FIG. 3 illustrates an event-skill view generated by the system in accordance with one or more embodiment of the present invention. The second layer (102) of the present invention constructs event-skill view based on the extracted events/timestamps from the individual content, in this case resume document. Let us consider that the second layer (102) of the present invention extracts time stamped data from the received content (i.e) resume document. The second layer (102) extracts the events/time stamped data from a set of contents (i.e) from a set of resume documents (R1, R2, R3, R4 and R5) received as shown below:

R1-E1 (2002-2004), E4 (2006-2008)
R2-E1 (2002-2004), E3 (2005-2007), E5 (2008-2012)
R3-E2 (2004-2005), E5 (2008-2012)
R4-E1 (2002-2004), E2 (2004-2005), E3 (2005-2007), E5 (2008-2012)
R5-E3 (2005-2007), E4 (2006-2008)

The events also have associated entities that are extracted and stored at the time of processing. In case of resume analysis, to create an event view, we also need to create the event-skill view. For example, consider the skills (S1, S2, S3, S4, S5, S6 and S7) associated with the events as shown below:

E1-S1, S4
E2-S1, S3, S5
E3-S2, S5, S6, S7
E4-S3, S4
E5-S2, S6, S7

The second layer (102) generates event skill view as a graph (as shown, FIG. 3) with three types of nodes resume (R), event (E) and Skill (S). The second layer (102) uses the event view so generated to answer a number of end user queries so as to retrieve all the resume having a skill S1 during the time-frame 2000-2005 or all the skills mentioned in the resume R1 that were earned between 2008-till now.

Figure 4:
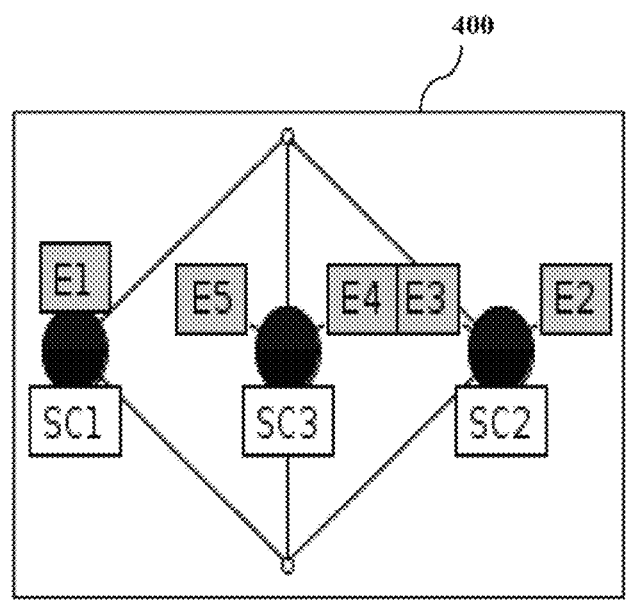
FIG. 4 illustrates a domain specific association view generated by the system in accordance with one or more embodiment of the present invention.

FIG. 4 illustrates a domain specific association view generated by the system in accordance with one or more embodiment of the present invention. The second layer (102) also extracts some domain specific associations that are defined either by the end user or derived based on domain using association rule mining techniques. The identified associations are in general stored as a graph in a graph store (103f). For instance, in the case of resume analysis, the second layer (102) identifies various sections (domains) of the resume and associates them with the events as shown below:

SC1-E1
SC2-E2, E3
SC3-E4, E5

The second layer (102) then applies a formal concept analysis, a causal analysis, association rules, a time-series overlap analysis or any other correlation methods to the extracted sections and their associations with the events to generate a domain specific association view (400) as shown in FIG. 4.

Thus the second layer (102) of the present invention generates different views so that the system may retrieve data efficiently for complex and domain specific queries. For instance, the domain specific queries may be "To find the resume that has skill S4 earned after 2007 while studying (say it is section SC3—Education)". Here skill S4 is an entity, after 2007 is an event and education is a domain.

FIG. 5a illustrates an exemplary caller-callee content (structured data) required for generating caller-callee view in accordance with one or more embodiment of the present invention. The caller-callee content (500) comprises caller id (501), callee id (502), caller phone number (503), callee phone number (504), start timestamp (505) indicating the time of initiation of phone calls and end timestamp (506) indicating the time of termination of phone calls. The system (100) of the present invention generates association between the caller and callee from the caller-callee content (500) as shown below:

Cr001-Ce002, Ce003, Ce005
Cr003-Ce004, Ce005
Cr003, Cr001-Ce005
Cr003, Cr002-Ce004

Figure 5B:
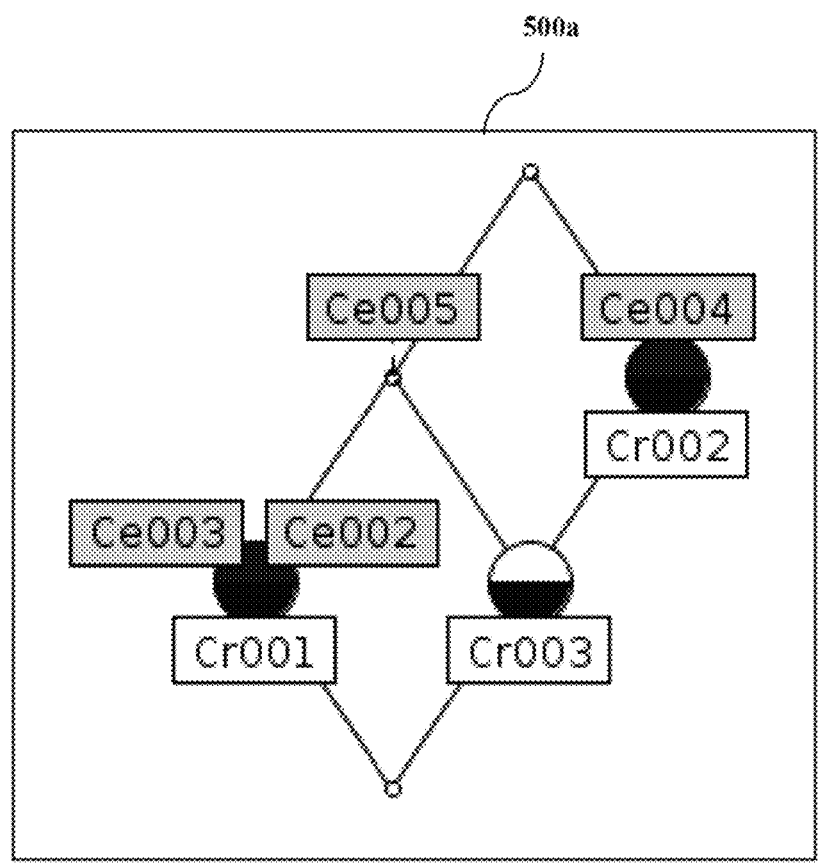
FIG. 5b illustrates a caller-callee view generated by the system in accordance with one or more embodiment of the present invention.

FIG. 5b illustrates a caller-callee view generated by the system in accordance with one or more embodiment of the present invention. The second layer (102) of the present invention generates caller-callee view (500a) as shown in FIG. 5b, using the above identified association between the caller and callee. The second layer (102) of the present invention also generates additional views such as caller-callee duration view, caller-callee call type view and caller-callee location view. In accordance with the exemplary embodiment of the present invention, influencer is an existing customer, who is important for the network provider and it is highly essential for the network provider to retain the relationship with the influencer, so that the influencer may not churn out from the network. Also the influencer may influence others in the network to churn out. To overcome the above mentioned problem, the system (100) of the present invention also allows the network operators to identify potential customer (influencer) in their network using the generated caller-callee view (FIG. 5b) along with the additional views such as caller-callee duration view, caller-callee type view and caller-callee location view. The system (100) of the present invention uses any graph algorithm known in the art for identifying influencer using the generated views.

When the end user queries the system (100) through the fifth layer (105) to identify potential customer (influencer), the system first identifies the customer who has maximum number of connection with all the other nodes. In this case, the system identifies Cr001 as the influencer, as Cr001 connects with other nodes in the network such as Ce002, Ce003, Ce005 and then expands the identified node Ce002, Ce003, Ce005 so as to cover other reachable nodes. So, in this case if Ce002, Ce003, Ce005 is expanded it will cover other set of nodes Ce002, Ce003, Ce004, Ce005. In this case, the entire set of customers is covered. The identified influencer may be used by the end user for business promotions such as delivery of promotional advertisements/ offers to the identified influencer, so as to retain the influencer.

In order to identify more than one influencer, the system (100) looks for next customer who has more number of connections with the other nodes.

The system (100) of the present invention also allows the end user to query for influencers with respect to call type. In such a case, the system queries the additional views such as caller-callee call type view so as to identify potential customers who are active in sending SMS.

Figure 6A:
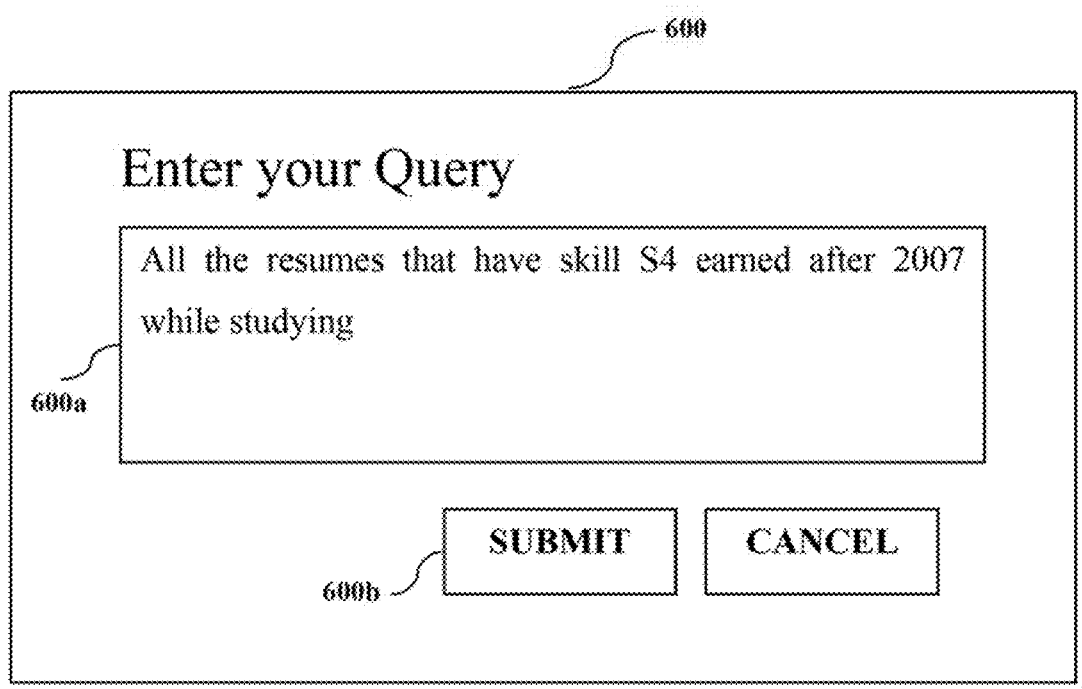
FIG. 6a illustrates a user interface view with an end user query submit option in accordance with one or more embodiment of the present invention.
Figure 7:
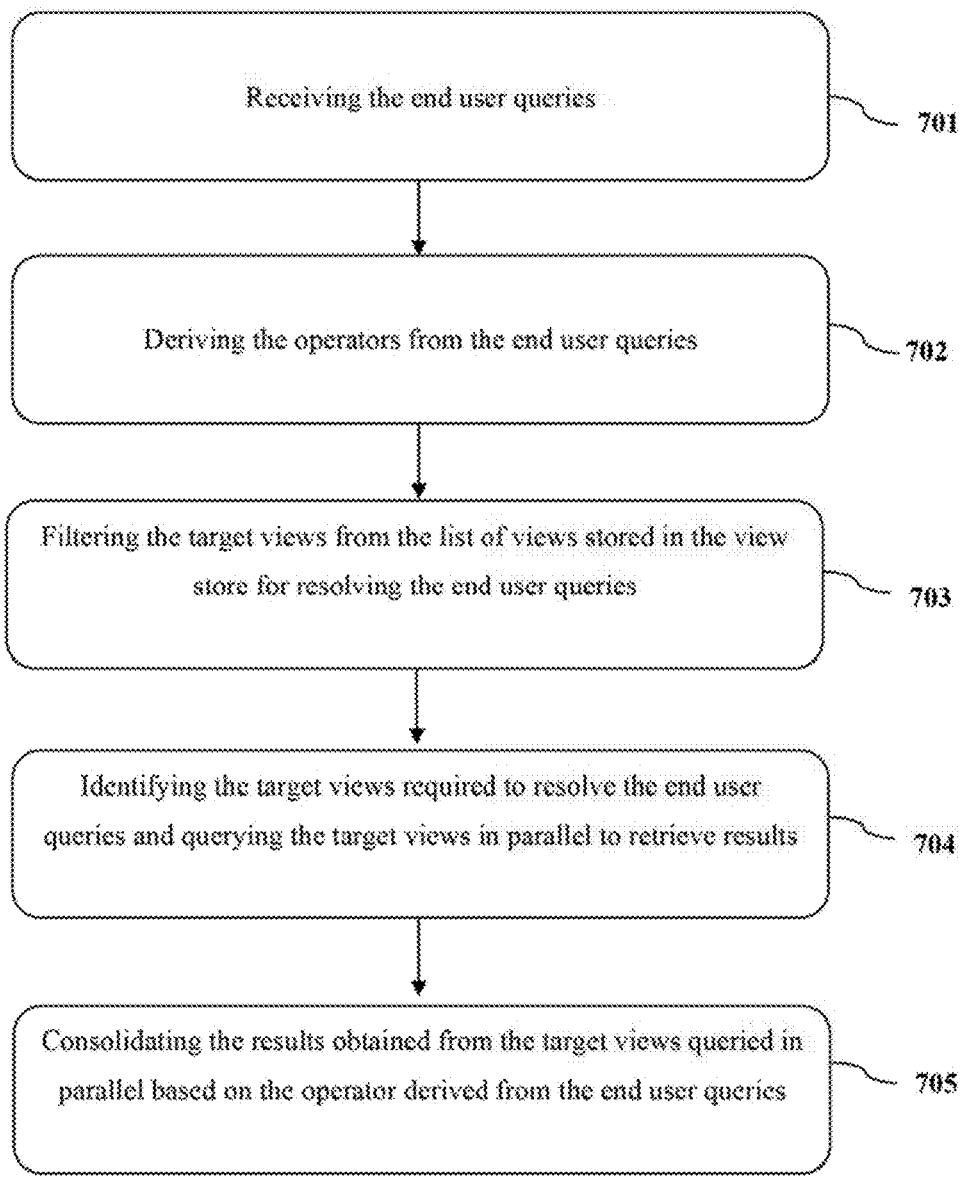
FIG. 7 illustrates a method for resolving end user queries in accordance with one or more embodiment of the present invention.
Figure 8A:
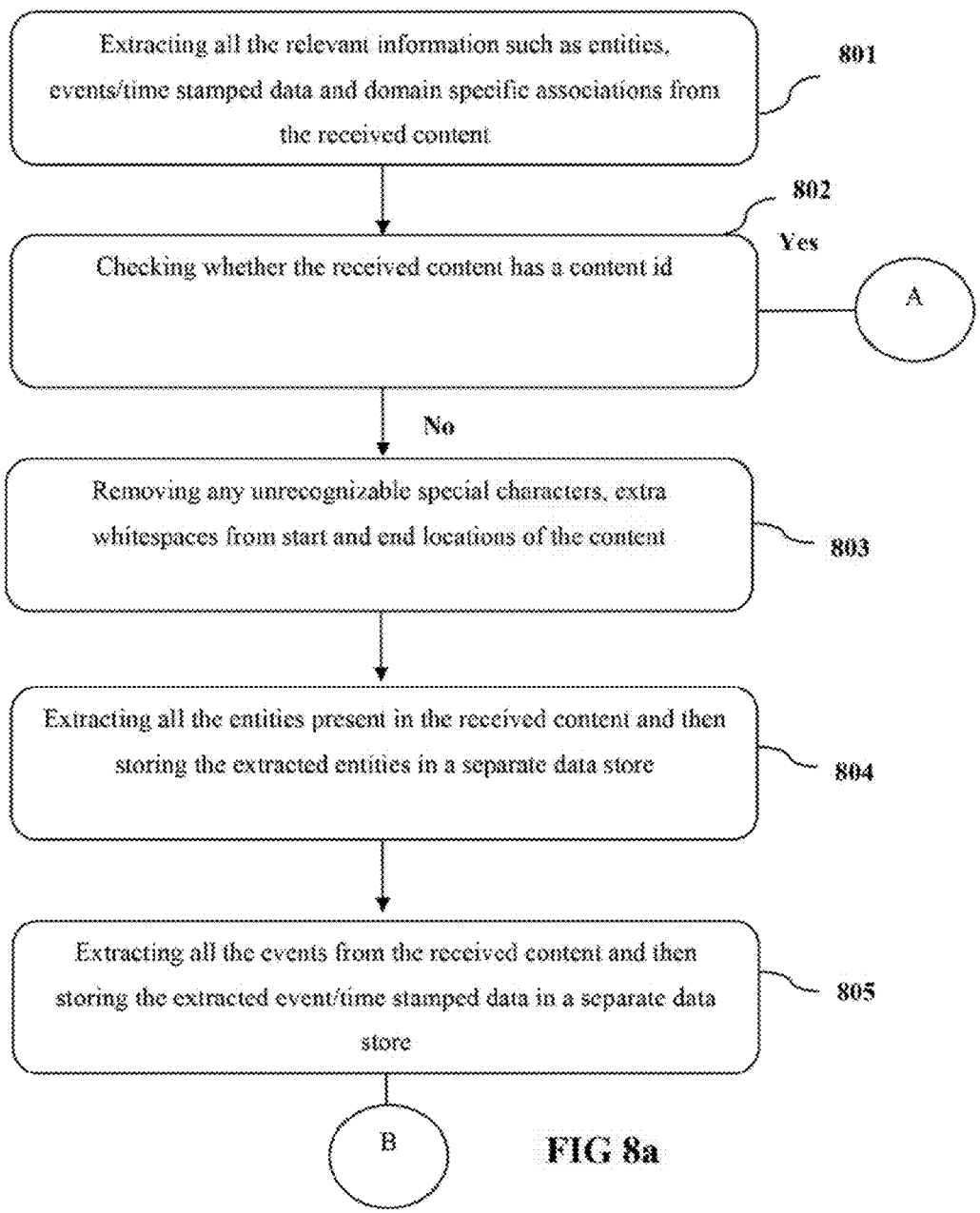
FIGS. 8a, 8b, 8c and 8d illustrate a method for data processing, storage and retrieval using data folding technique in accordance with one or more embodiment of the present invention.
Figure 8B:
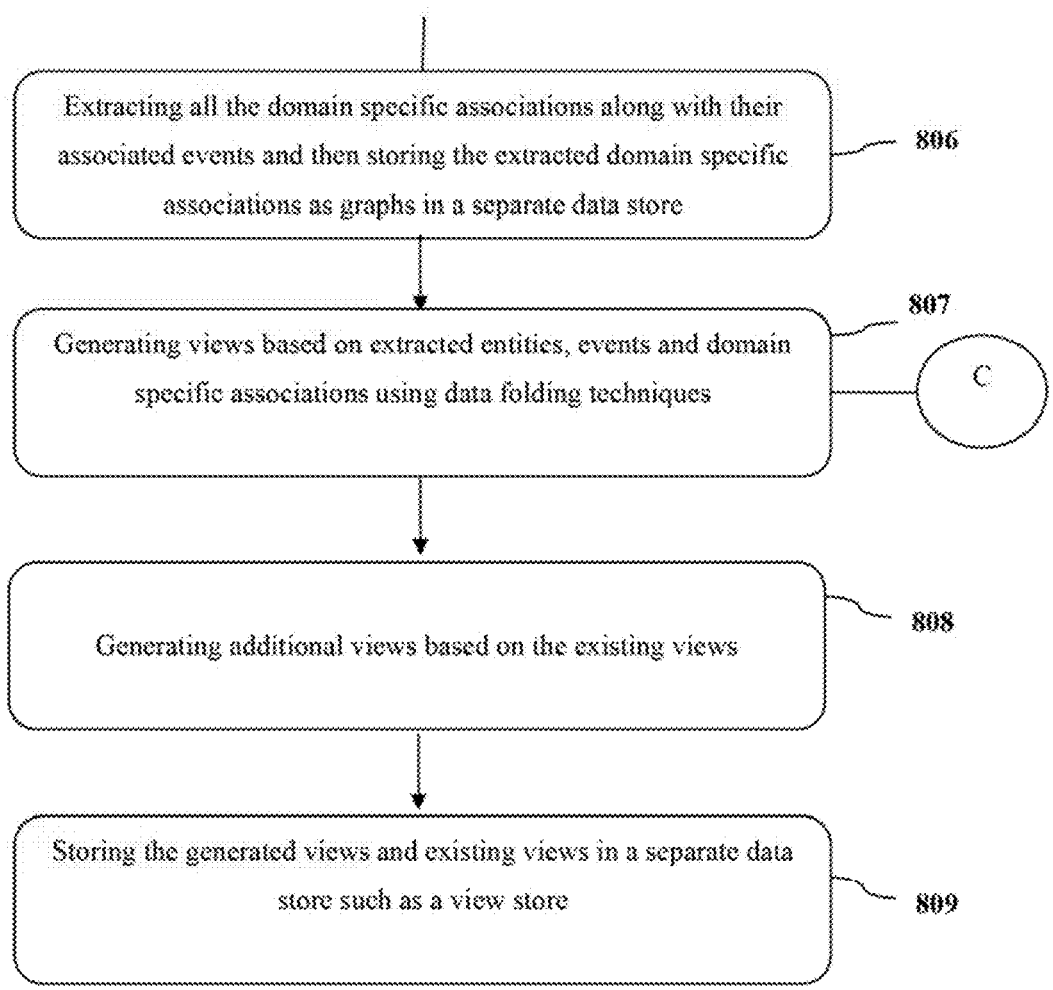
Figure 8C:
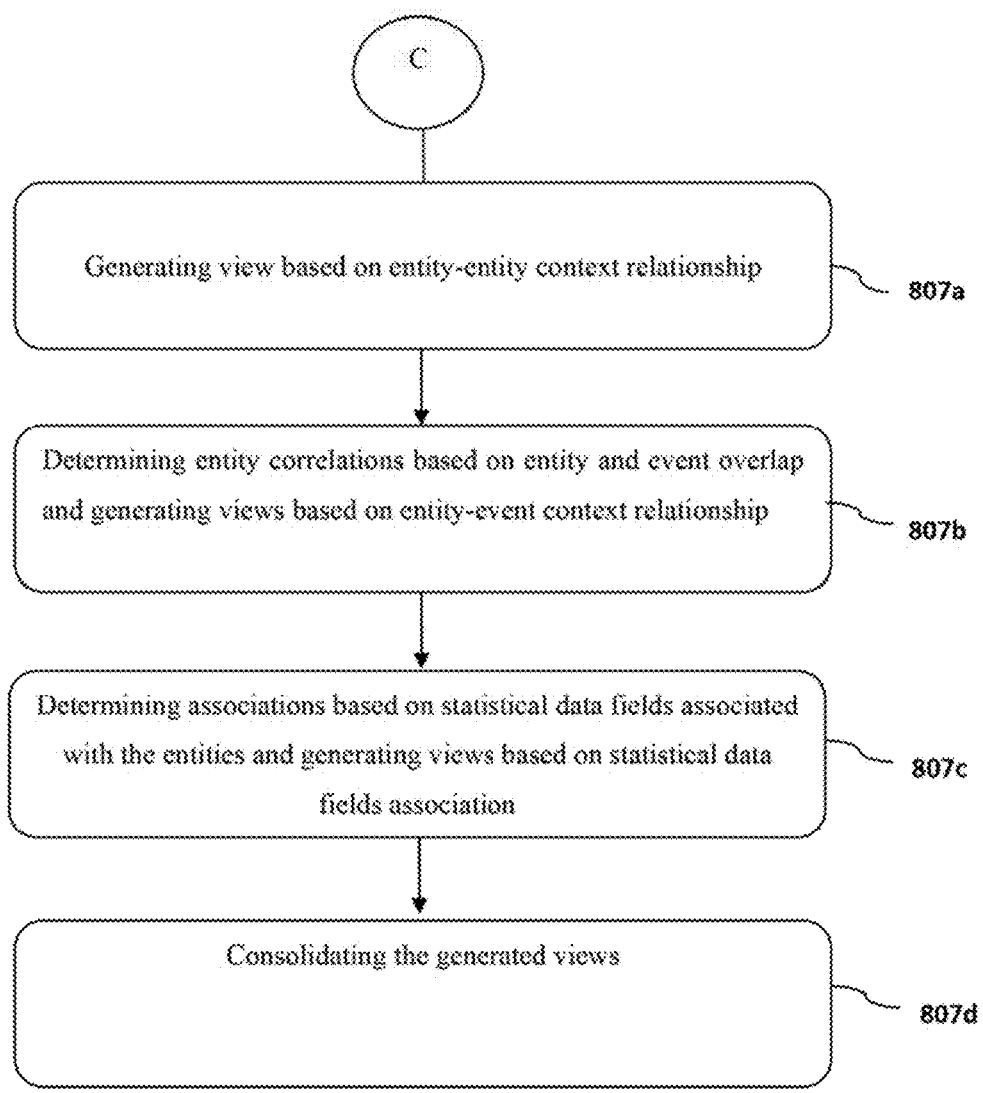
Figure 8D:
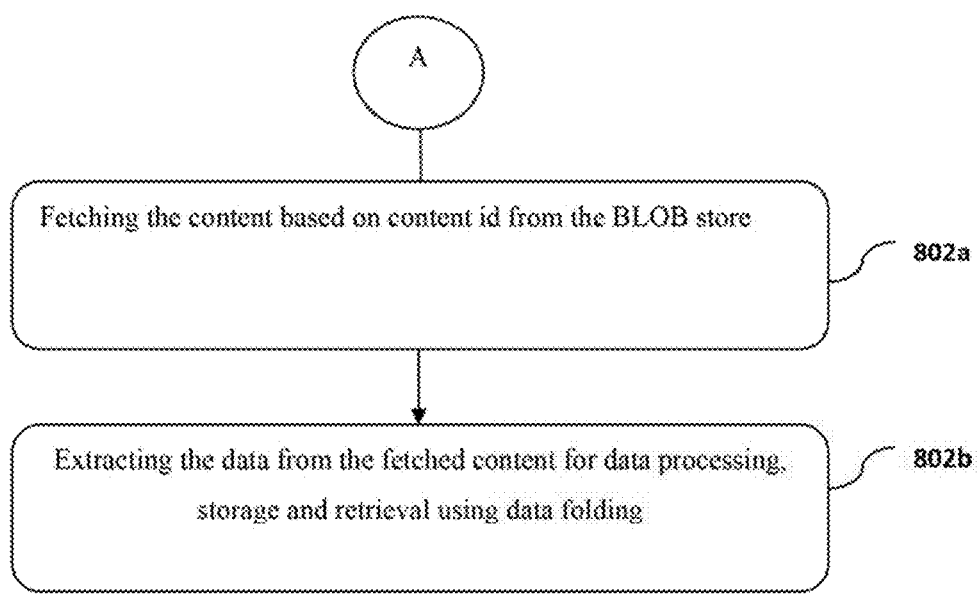

FIG. 6a illustrates a user interface view with an end user query submit option in accordance with one or more embodiment of the present invention. As shown in FIG. 6a, the user interface (600) allows the end user to enter user queries in the query box (600a) and then on clicking the submit button (600b), the system (100) receives the end user queries and provides the required responses by executing steps 701-705 (FIG. 7).

Figure 6B:
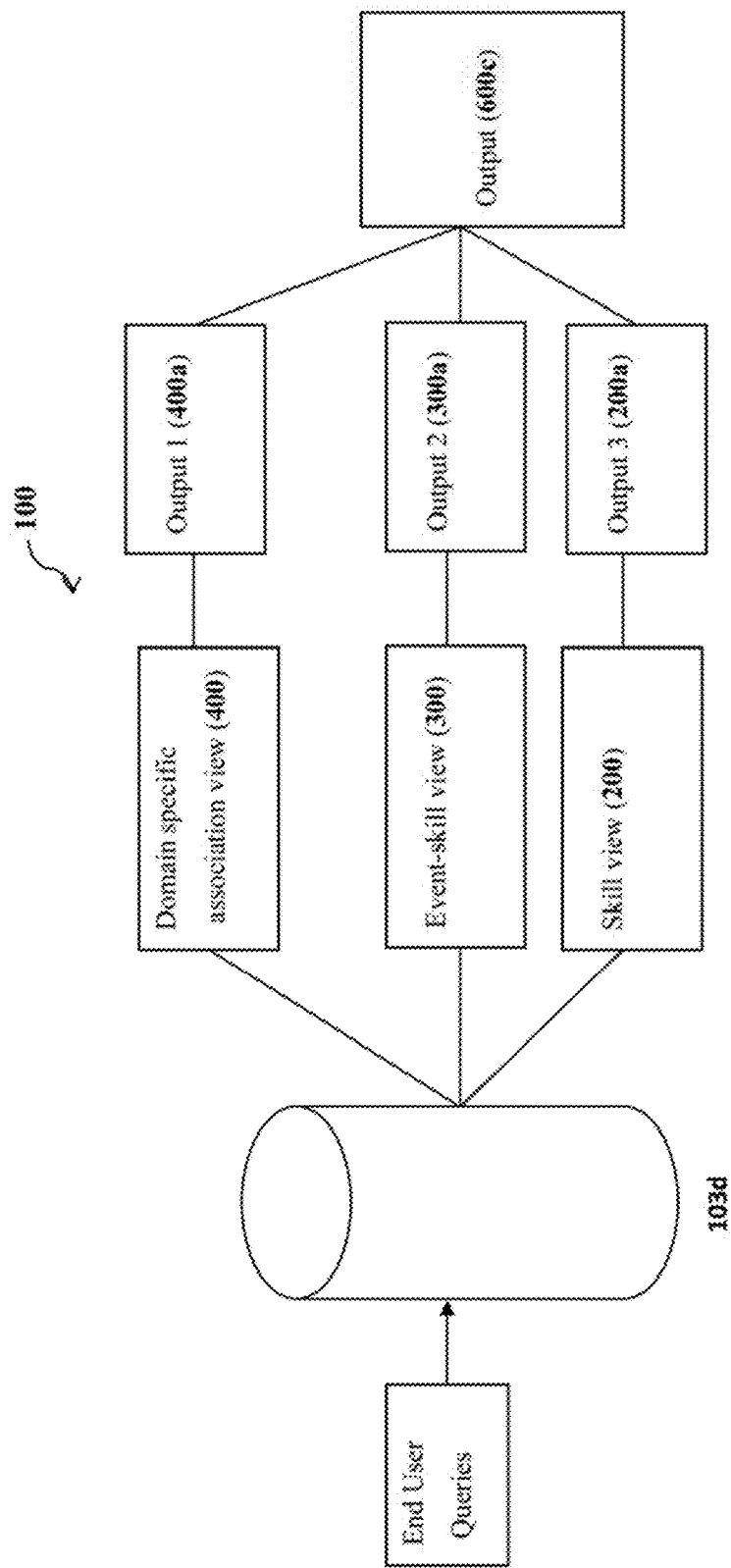
FIG. 6b illustrates a graphical representation of the end user query retrieval process in accordance with one or more embodiment of the present invention.

FIG. 6b illustrates a graphical representation of the end user query retrieval process in accordance with one or more embodiment of the present invention. The system (100) of the present invention on receiving the end user queries maps the end user queries to a SQL kind of construct and passes the SQL kind of construct to the view store (103d), wherein the view store (103d) is optimized to serve the end user queries by traversing through the views stored in the view store (103d). The system (100) filters the target views required to resolve the end user queries. Once the target views are identified, the system (100) queries the target views in parallel to retrieve the results. Here each execution branch includes one or more steps based on the target entity required to retrieve the result. The system also consolidates the results obtained from the target views queried in parallel based on the operator derived from the end user queries.

The retrieval of data for the end user queries (as shown in FIG. 6a), using the system of the present invention is illustrated using unstructured data such as a resume document in accordance with one or more embodiment of the present invention (as shown in FIG. 6b). For instance, if the query is to retrieve "All the resumes that have skill S4 earned after 2007 while studying (say it is section SC3—Education)". In this case, the target entities to be retrieved are actual resume and hence the views are queried in parallel until the target resume entities are resolved. Based on the above query, the system (100) queries the section views stored in the view store (103d) so as to identify the target section view (i.e) domain specific association view (400) so as to retrieve all the entities (resumes) having section SC3 (i.e) output 1 (400a) using the content id stored in the section view. The system (100) also queries the views stored in the view store (103d) in parallel to identify the target event skill view (300) so as to retrieve all entities (resumes) having event later than 2007 (i.e) output 3 (200a). The system (100) also queries the resume skill view in parallel to identify the target skill view (i.e) (200) so as to retrieve all entities (resumes) having the skill S4 (i.e) output 2 (300a). The system (100) then consolidates the results (in this case unstructured data such as a resume) output 1 (400a) derived from the target section view (400), output 2 (300a) derived from the target event skill view (300) and output 3 (200a) derived from target skill view (200) based on the operators derived from the query so as to derive the final output (600c) comprising all the resumes having skill S4 earned after 2007 while studying. Since in the above query the operator used is "AND", the consolidated set contains all the resumes having skill S4 earned after 2007 while studying.

In accordance with one or more embodiment of the present invention, the end users use any computing device to query the system (100) of the present invention. Here the computing device is a handheld computer, a notebook computer, a tablet computer, a personal computer, laptop computer, a generic purpose computer, a specific purpose computer or any computing device that supports two way interactions with the end user using graphical user interface.

FIG. 7 illustrates a method for resolving end user queries in accordance with one or more embodiment of the present invention. The method for resolving the end user queries comprises the steps of receiving the end user queries in step 701. Deriving the operators from the end user queries in step 702 and in step 703 filtering the target views from the list of views stored in the view store for resolving the end user queries. In step 704, identifying the target views required to resolve the end user queries and querying the target views in parallel to retrieve results. In step 705, consolidating the results obtained from the target views queried in parallel based on the operator derived from the end user queries so as to deliver final result through a delivery channel. Here the consolidation happens around the around the target entity to be retrieved.

FIGS. 8a, 8b, 8c and 8d illustrate a method for data processing, storage and retrieval using data folding technique in accordance with one or more embodiment of the present invention. The method for data processing, storage and retrieval using data folding technique comprises the steps of: extracting all the relevant information such as entities, events/time stamped data and domain specific associations from the received content in step 801. In step 802, checking whether the received content has a content id and if the conditions in step 802 holds true then the control is transferred to step 802a, else the control is transferred to step 803. In step 802a fetching the content based on content id from the BLOB store (103b) and then extracting the content in step 802b, then the control is transferred to step 803. In step 803, removing any unrecognizable special characters, extra whitespaces from start and end of content in step 803. In step 804, extracting all the entities present in the received content and then storing the extracted entities in a separate data store. In step 805, extracting the events from the received content and then storing the extracted events in a separate data store. In step 806, extracting all the domain specific associations along with their associated events and then storing the extracted domain specific associations as graphs in a separate data store. In step 807, once all the entities, events and domain specific associations are extracted then generating views using data folding technique based on the extracted entities, events and domain specific associations by executing steps (807a-807d). In step 808, generating additional views based on the existing views (views generated in step 807). In step 809, storing the generated views and existing views in a separate data store.

In accordance with one embodiment of the present invention, generating views based on extracted entities, events and domain specific associations comprises the steps of generating view based on entity-entity context relationship in step 807a. Determining entity correlations based on entity and event overlap, and generating views based on entity-event context relationship in step 807b. In step 807c, determining associations based on statistical data fields associated with the entities and generating views based on statistical data fields association. Consolidating the generated views in step 807d.

In accordance with one or more embodiment of the present invention, data folding technique is the process of creation of data lattices from the extracted entities, events and domain specific associations and storing the created data lattice as a view. Here the data lattices are created using at least any one of the applicable correlation technique such as a formal concept analysis, a causal analysis, association rules, a time-series overlap analysis or any other correlation method.

In accordance with one or more embodiment of the present invention, the views are generated periodically and the domain specific associations are user defined.

Thus the system and method of the present invention pre-processes the data before storing the data in a data store. During the pre-processing time, the system extracts all the relevant information such as entities, events/time stamped data and domain specific associations, and stores them separately in different data store. The system of the present invention creates data lattices and stores the created data lattice as a view in such a way that the analysis and retrieval of complex end user queries are done efficiently in a seamless manner.

The system and method of the present invention may also be used for identifying potential customer for targeted business promotions in an e-commerce scenario. In this case, the first layer (101) of the system fetches the content necessary for creating views such as customer data, customer purchase data from an external e-commerce web server. The second layer (102) uses a knowledge base and stores the customer related data such as customer name, customer address, purchased item code number and purchased item name in an entity store. The second layer (102) stores customer purchasing activities such as the period during which the customer purchased the product in an event store. Once all the entities, events and their associations are identified, the system creates various views such as customer view, customer-purchasing-period view, customer's referrals view based on the content fetched from external e-commerce web server using data folding techniques and stores the created view using data folding techniques in a separate data store. The system of the present invention also generates various event views based on customer purchasing activities on a daily, weekly or a monthly basis and the system may be queried to identify the customers who has made frequent purchases in the e-commerce site for the last 20 days and the other users who has brought the similar type of products, so that the system (100) may push some recommendation/business promotions to the customer who has made frequent purchases in the e-commerce site for the last 20 days by querying the views stored in a view store (103*d*).

The system and method of the present invention may also be used for alerting the person driving the vehicle, that the vehicle is running out of fuel and in next 5 mile the tank has to be re-filled. For this purpose, the first layer (101) of the system (100) fetches GPS data from a GPS tracker and fuel level data from a fuel level sensor placed in the tank of the vehicle. The second layer (102) creates various views based on locations using data folding techniques, such as location based nearby fuel stations view. Once the system (100) identifies that the vehicle runs out of fuel, the system (100) queries the location based nearby fuel station view to identify the nearby fuel stations pertaining to the vehicle current location and alerts the vehicle owner that "the car is running out of fuel along with a list of nearby fuel stations". To achieve the above functionality, the fifth layer (105) allows the end user to create an application for querying the location based views, when the received fuel level data from the fuel level sensor falls below a pre-determined threshold. So that, when the system (100) identifies that the vehicle runs out of fuel, from the received fuel sensor level data, the system (100) queries the location based nearby fuel stations view and alerts the person driving the vehicle through his mobile phone.

The foregoing description of the embodiments of the invention has been presented with a system for processing, storing and retrieving resume, caller-callee content, e-commerce purchasing activities, GPS and sensor content for the purposes of illustration only. The system (100) of the present invention is capable of processing, storing and retrieving any structured or unstructured data and is not restricted to the foregoing examples. It is not intended to be exhaustive or to limit the invention to the precise form disclosed. Many modifications and variations are possible in the light of the above invention. It is to be understood that the phraseology or terminology employed herein is for the purpose of description and not of limitation. It is intended that the scope of the invention be limited not by this detailed description, but rather by the claims appended hereto.

We claim:

1. A system comprising a computer device for providing data processing, storage and retrieval using data folding technique, wherein the system further comprises:
   a) a first layer responsible for fetching content from external data sources;
   b) a second layer responsible for classifying, comparing and correlating the content fetched from external data sources in the first layer, and
   wherein the second layer is further configured to:
      remove any unrecognizable special characters, extra whitespaces from the start and end location of the fetched content,
      extract all the relevant information comprising of entities, events, domain specific associations from the fetched content,
      store the extracted entities, events, domain specific associations based on its context in a first separate data store,
      generate views based on the extracted entities, events and domain specific associations along with their associated events, and
      generate additional views based on the generated views;
   c) a third layer comprising a storage engine, wherein the storage engine is configured to store the fetched classified content from the second layer based on its type;
   d) a fourth layer responsible for coordinating all the activities within the system;
   e) a fifth layer with a platform for allowing an end user to perform analysis on the data stored in the storage engine; and
   f) a sixth layer that acts as a delivery channel for delivering the results to the end user computing device.

2. The system as claimed in claim 1, wherein the storage engine further comprises:
   a) a separate store for storing the content fetched from the first layer for data processing;
   b) an entity store for storing the extracted entities along with the start and end location of the entities within the fetched content;
   c) an event store for storing the extracted events along with the start and end location of the events within the fetched content;
   d) a graph store for storing the extracted domain specific associations along with the associated events as graphs; and
   e) a view store for storing the various views generated using the extracted entities, events and domain specific associations.

3. The system as claimed in claim 1, wherein the second layer pre-processes the content at the time of storage.

4. The system as claimed in claim 1, wherein the second layer comprises a knowledge base to extract the entities based on the context.

5. The system as claimed in claim 1, wherein the second layer creates data lattices using the relationships identified between the entities, events and their association during the pre-processing stage.

6. The system as claimed in claim 5, wherein the second layer stores the created data lattices as a view in a view store.

7. The system as claimed in claim 6, wherein the stored view is retrieved later for analysis purposes.

8. The system as claimed in claim 5, wherein the second layer creates data lattices by using at least any one of the applicable correlation technique such but not limited to a formal concept analysis, a causal analysis, association rules, a time-series overlap analysis or any other correlation technique.

9. The system as claimed in claim 8, wherein the correlation technique is chosen based on the possible relationships between the identified entities, events and their explicit associations identified during the pre-processing stage.

10. The system as claimed in claim 1, wherein the content includes at least one or more of a structured data, an unstructured data and the content generated using free form.

11. The system as claimed in claim 10, wherein the unstructured data contains at least one of a plain text document, an e-mail message, a web page, a word processing document, a spreadsheet, a presentation material, a scanned document, a PDF file, a media report, a case file, transcriptions and an enterprise content.

12. The system as claimed in claim 10, wherein the structured data contains at least one of a transactional data, data stored in a relational database and any dataset that has a predefined structure.

13. The system as claimed in claim 1, wherein the system is capable of retrieving complex and domain specific end user queries.

14. The system as claimed in claim 1, wherein the system on receiving the end user query is configured:
   a) to identify the target views required to resolve the end user queries; and
   b) to query the target views in parallel to retrieve the results.

15. A method for providing data processing, storage and retrieval using data folding technique, wherein the method comprises the steps of:
   a) fetching content from external data sources;
   b) extracting all the relevant information comprising of entities, events/time stamped data and domain specific associations from the fetched content;
   c) removing any unrecognizable special characters, extra whitespaces from start and end locations of the content fetched;
   d) extracting all the entities present in the content fetched and then storing the extracted entities in a first separate data store;
   e) extracting all the events present in the fetched content and then storing the extracted events in a second separate data store;
   f) extracting all the domain specific associations along with their associated events and then storing the extracted domain specific associations along with their associated events as graphs in a third separate data store;
   g) generating views based on the extracted entities, events and domain specific associations along with their associated events,
   wherein the generating further comprises the steps of:
      generating views based on entity-entity context relationship,
      determining entity correlations based on entity and event overlap and generating views based on entity-event context relationship,
      determining associations based on the statistical data fields associated with the entities,
      generating views based on statistical data fields association, and
      consolidating the generated views based on entity-entity context relationship;
   h) generating additional views based on the generated views; and
   i) storing the generated additional views and generated views in a fourth separate data store.

16. The method as claimed in claim 15, wherein the views are generated using data folding techniques.

17. The method as claimed in claim 16, wherein the data folding technique comprises the steps of:
   a) creating data lattices from the extracted entities, events and domain specific associations; and
   b) storing the created data lattice as a view.

18. The method as claimed in claim 15, wherein the method allows an end user to query the views stored in the separate data store.

19. The method as claimed in claim 18, wherein the end user queries are resolved by:
   a) receiving the end user queries;
   b) deriving the operators from the end user queries;
   c) filtering the target views from the list of views stored in the separate data store for resolving the end user queries;
   d) identifying the target views required to resolve the end user queries and querying the target views in parallel to retrieve results; and
   e) consolidating the results obtained from the target views queried in parallel based on the operator derived from the end user queries so as to deliver final result through a delivery channel.

\* \* \* \* \*